United States Patent [19]
Hui

[11] Patent Number: 5,970,639
[45] Date of Patent: Oct. 26, 1999

[54] INNOVATED TYPE OF HAZARD ALARM SIGN

[76] Inventor: Liao Chih Hui, 8F-6, No. 100, Sec, 2, Hoping E. Rd., Taipei, Taiwan

[21] Appl. No.: 09/090,784

[22] Filed: Jun. 4, 1998

[51] Int. Cl.$^6$ ............................... E01F 9/00; G09F 13/16
[52] U.S. Cl. ............................... 40/610; 40/612; 116/637
[58] Field of Search ..................... 40/610, 612; 116/63 T

[56] References Cited

U.S. PATENT DOCUMENTS

| | | | |
|---|---|---|---|
| 5,349,346 | 9/1994 | Wu | 116/63 T |
| 5,606,309 | 2/1997 | Smith | 116/63 T |
| 5,651,636 | 7/1997 | Yeh | 116/63 T |
| 5,775,253 | 7/1998 | Quan et al. | 116/63 T |

*Primary Examiner*—Cassandra H. Davis
*Attorney, Agent, or Firm*—Rosenberg, Klein & Bilker

[57] ABSTRACT

A hazard alarm sign is provided that includes a storage box and an alarm unit that is hinged to an interior portion of the storing box. A battery is located on one side of the bottom interior portion of the storage box. On the other side, there is fitted a powerful magnet and a screwdriver. An alarm rack is provided that is formed by three racks, each rack being made of a transparent material. Inside each rack is a lamp holding plate carrying a number of LED lamps. One of the racks is hinged to a fixing unit mounted to the storage box. The ends of the other two racks are hinged to form a structure having one fixed rack and two movable racks. The alarm unit can be collapsed and stored inside the storage box, and the powerful magnet will hold onto the trunk or roof of a car. The two movable alarm racks are erected to form a triangular alarm sign. When the power is turned on, the LED lamps are driven to provide flashing light.

1 Claim, 5 Drawing Sheets

INNOVATED TYPE OF HAZARD ALARM SIGN

BACKGROUND OF THE INVENTION

The invention relates to an innovated type of hazard alarm sign, particularly to a type of alarm sign structure that is composed of a storing box and three alarm racks that can be erected to form a triangular alarm sign, while the LED lamps on the racks will emit flashing light to produce excellent alarm and cautionary effects.

A hazard alarm sign is a necessary equipment in a traveling ear. In case of driving failure, the triangular hazard alarm sign can be taken out and placed at an appropriate distance behind the car, to caution the coming cars to take other traffic lanes, to assure the safety to the driver, other drivers and their cars; a conventional hazard alarm sign is composed of three triangular flat plates, the three plates can be collapsed or erected to form a triangle, on the plate surfaces are light-reflecting strips, so they will reflect the light coming from the cars behind to caution them of hazard ahead, However, since the reflecting effects of said conventional type of hazard alarm sign are passive, which can be easily detected on a fine day with good visibility, but in nighttime or a day with poor visibility (such as a cloudy, rainy or a foggy day), said hazard alarm sign could not be detected without being directly lit and reflected by another car behind it, which will involve various unpredictable circumstances (such as poor weather condition, the car coming behind has not switched on head lights, or location on a curving road, etc.), in which case, the car behind will not be able to detect any hazard ahead and the result would be tragic accidents, therefore, a conventional type of hazard alarm sign does involve shortcomings that need to be redressed.

In view of the above shortcomings, the inventor has devoted in the research, and has amended the conventional "passive" cautionary performance to a type of "active" cautionary performance, and after such research and development processes in designing, test production, experiments and amendments, has finally presented a successfully tested invention of "innovated type of hazard alarm sign" that can be easily erected or collapsed, that can be securely sucked onto the car, to provide eye-catching distant lighting cautionary effect, and to assure the safety to the car in question as well as other cars with effective improvement on said shortcomings.

To enable further understanding of the structural characteristics and physical performances of the invention, the embodiment of the present invention is described in details accompanied by drawings below:

BRIEF DESCRIPTION OF NUMERALS

| | |
|---|---|
| 10 storage box | 21 catch groove |
| 11 battery | 22 box cover |
| 12 erecting plate | 23 nonskid pad |
| 13 control circuit board | 31 front rack |
| 14 switch | 32 middle rack |
| 15 power socket | 33 rear rack |
| 16 powerful magnet | 34 lamp holding plate |
| 17 screwdriver | 35 LED lamp |
| 18 fixing unit | 36 hollow shaft |
| 19 fixing unit | 37 hollow shaft |
| 20 elastic snap | 38 snap hole |

DETAILED DESCRIPTION OF PREFERRED EMBODIMENT

Figure 1:
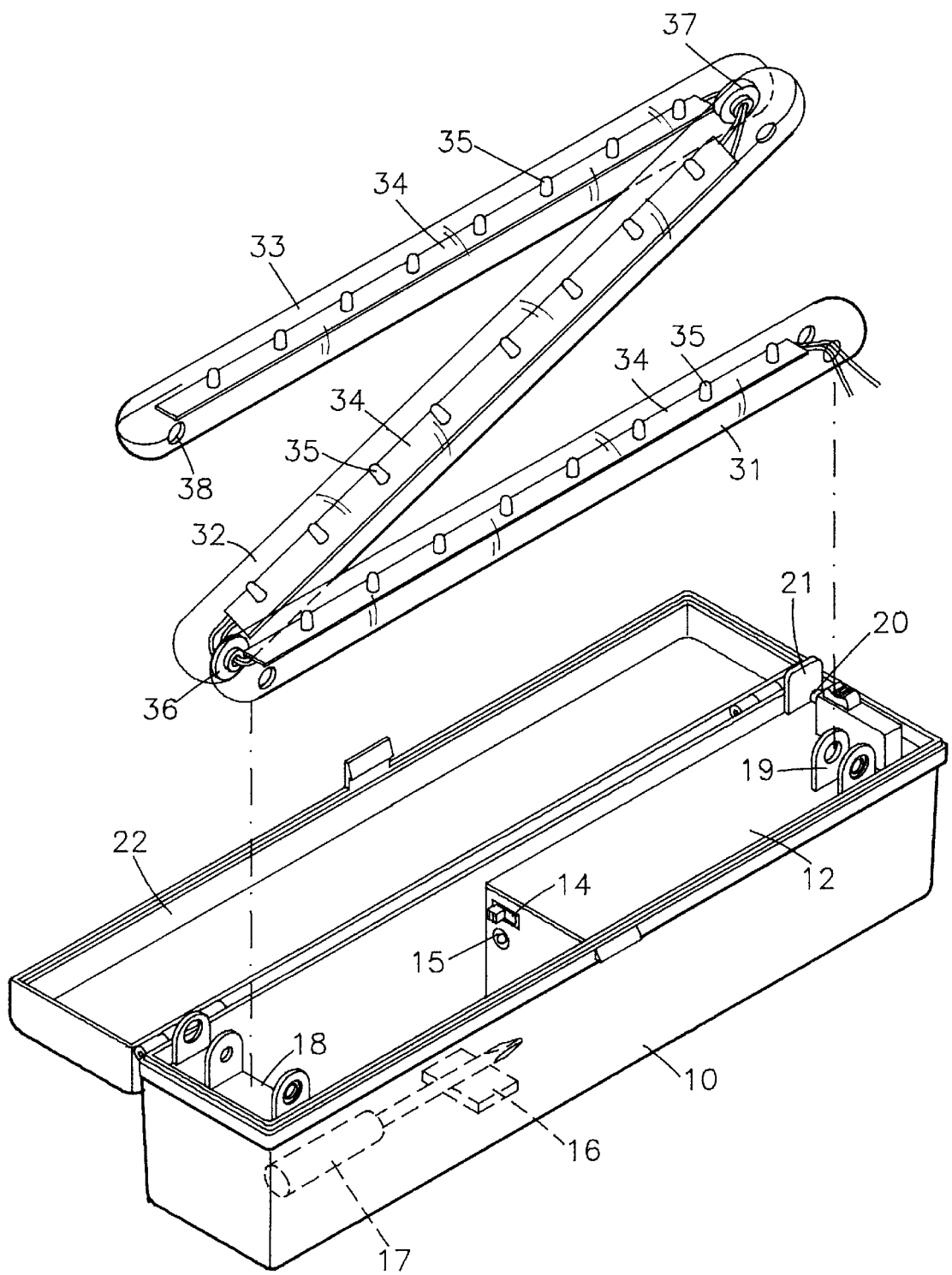
FIG. 1 is a perspective view of the invention.
Figure 2A:
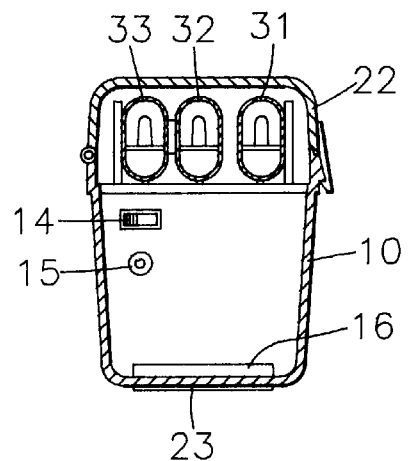
FIG. 2A is a sectional view of FIG. 2 A—A.
Figure 2:
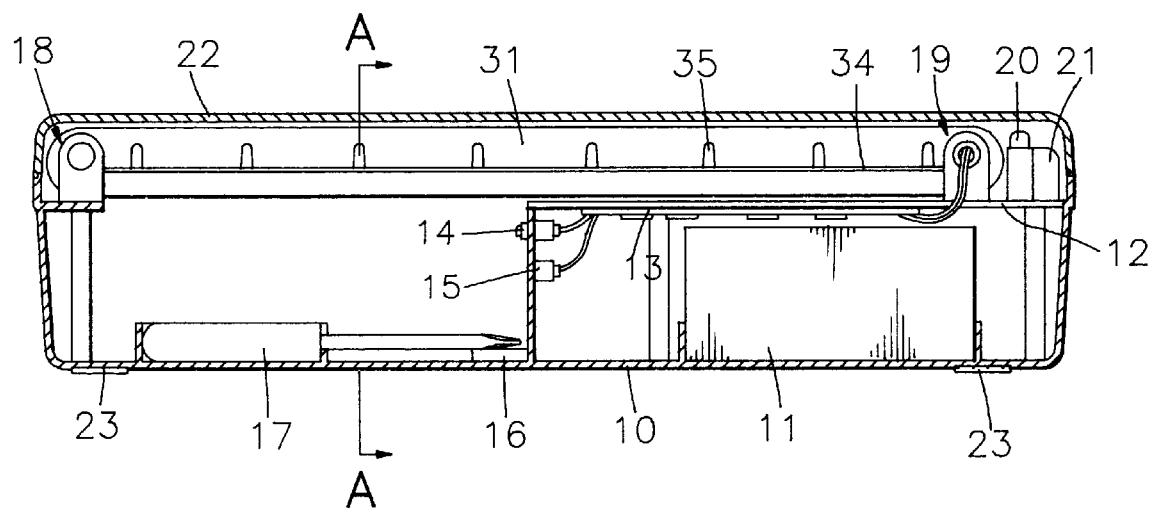
FIG. 2 is a sectional view of the invention.

Please refer to FIGS. 1 and 2, the invention comprises mainly a storing box 10 and an alarm rack that is hinged to the inside of the box, wherein:

The storing box 10: on one side of the bottom part inside the box is a 12V battery 11, on the erecting plate 12 at its top part is a control circuit board 13, on its sides are respectively a switch 14 and a power socket 15, said control circuit board 13 is supplied with power from the battery 11, or the power may come from a cigarette lighter socket in a car which 12V batter supplies power to the power socket 15, by turning on or oft the switch 14, the control circuit board 13 will drive its LED (to be described later) to produce flashing effects, on the other side at the bottom part inside the storing box 10 is a powerful magnet 16, on its side may be placed a screwdriver 17, on two sides of the front edge of the top part of the box body are fixing units 18 and 19, beside one fixing unit 19 at one side is an elastic snap 20, on its rear edge is a catch groove 21, on top of said storing box 10 is hinged a box cover 22 that can be covered and fastened to the box body, while at two ends of the bottom of the box are nonskid pads 23.

Figure 3:
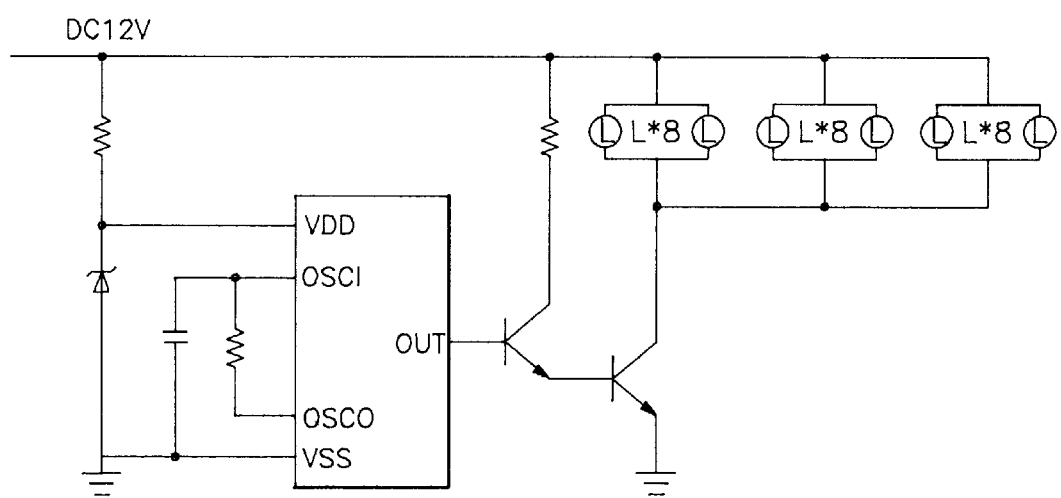
FIG. 3 is a wiring diagram of the invention of control circuit.

The alarm rack: composed of three racks, a front rack 31, a middle rack 32 and a rear rack 33, the casing of each rack is made of a transparent material, inside each is a lamp holding plate 34, on the plate are welded a number of LED lamps 35, wherein, the front rack 31 is fixed to the fixing units 18 and 19 at the front edge of said storing box 10, the left end of the middle rack 32 is hinged with a hollow shaft 36 to the left end of the front rack 31, the night end of the rear rack 33 is hinged with a hollow shaft 37 to the right end of the middle rack 32, at the left end of the rear rack 33 is a snap hole 38, the lamp holding plates 34 inside the racks are in parallel connection with the control circuit board 13 inside the storing box 10 to form an integrated circuit, as illustrated in FIG. 3, wherein the serial connection between the lamp holding plates 34 of different racks are achieved by means of electric wires running through the hollow shaft 36.37 joining the racks.

Figure 4:
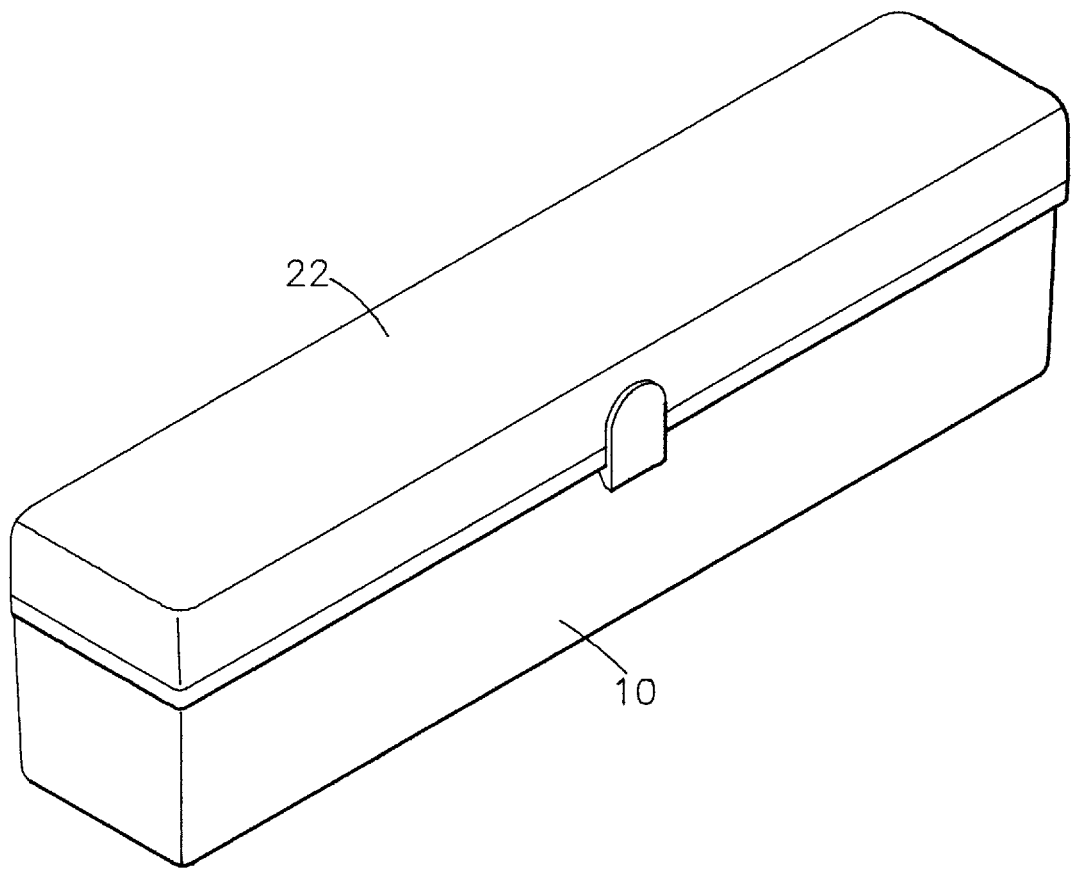
FIG. 4 is a view of a compact unit when it's collapsed or stored.
Figure 5:
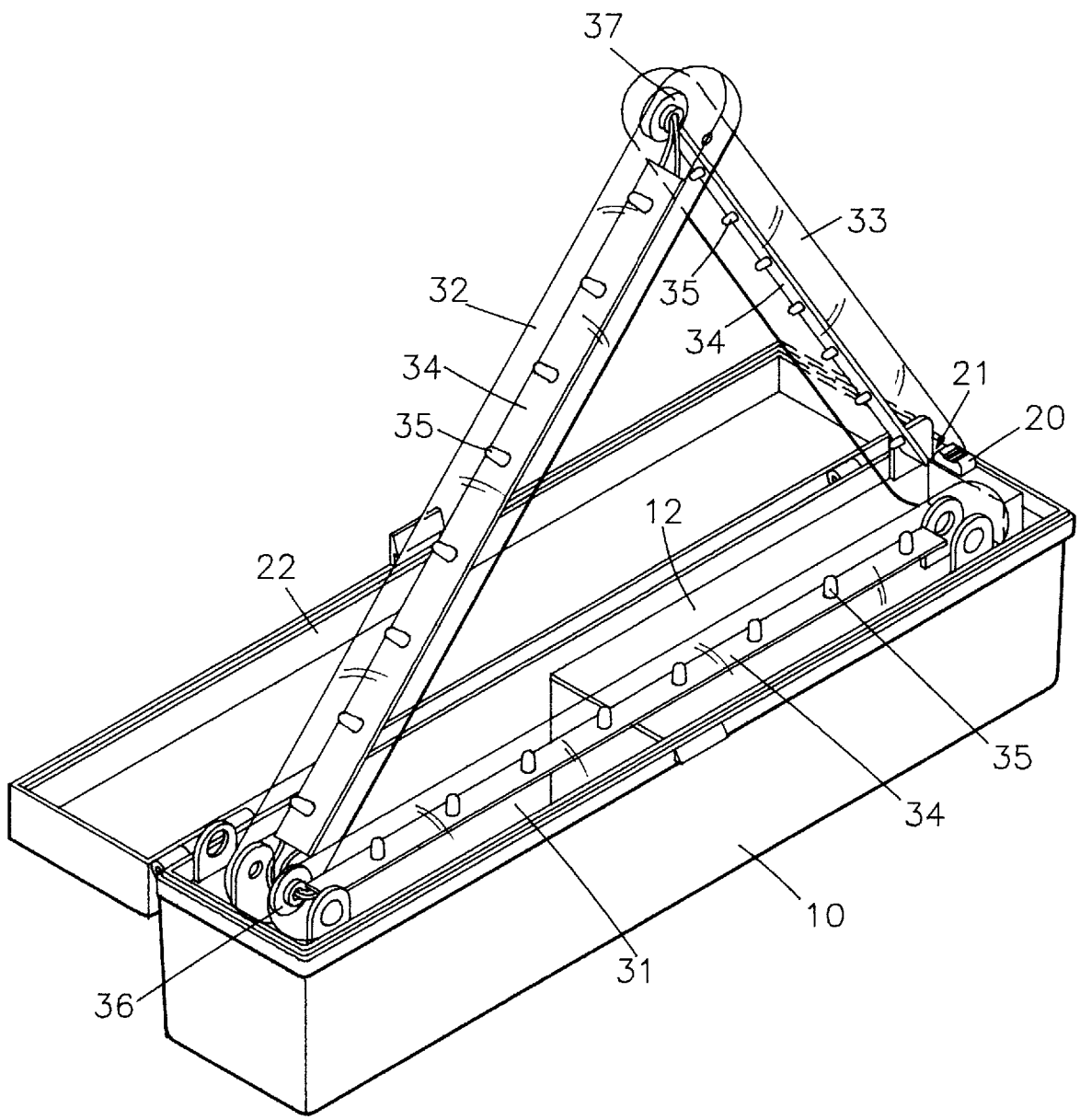
FIG. 5 is a view of the invention after it is erected to become a hazard alarm sign.

With said construction, when the invention of alarm racks is not in use, it can be collapsed and stored onto the erecting plate 12 in the storing box 10, then the box cover 22 is covered to become a compact unit as shown in FIG. 4, which can be easily carried or stored; in case a car could not be re-started in the middle of traffic, the user just have to pull it over, take out the invention, the powerful magnet 16 in the storing box 10 will enable the invention to hole solidly to the top of a car trunk or a car roof, and since there are the foam rubber or rubber-made nonskid pads 23, they will prevent the box body from sliding, and keep the car paint from being scraped, as is shown in FIG. 5, after the box cover 22 is opened, the middle rack 32 and the rear rack 33 of the alarm unit are lifted from their joints (since the front rack 31 has been fixed, it will stay in its transverse position), wherein the middle rack 32 will incline up to the left, while the rear rack will incline down to the right, then the right end of the rear rack 33 is inserted in the catch groove 21 of the storing box 10, and fixed by extending the elastic snap 20 into the snap hole 38, so the whole alarm unit is erected to form a triangular structure, then the user may choose optional power sources, either the power from the battery 11 in the box by directly turning on the switch 14 on the control circuit board 13, or the power from the car battery by connecting a power cord supplied with the package of the invention to the car cigarette lighter socket and to the power socket 15 inside the invention of the box body, and after power is attained from the battery, the switch 14 on the control circuit board 13 is turned on, and when the circuit on the control circuit board 13 is activated, the LED lamps 35 in all racks of the alarm unit will be activated to produce an alarming effect with alternatively flashing lamps, so that in the daytime or nighttime, in a cloudy or raining weather, the invention will produce long-range and conspicuous alarm effects, to caution the coming cars to take other traffic lanes in time, thus assuring the safety of the user's car as well as other traveling cars. In case the car in question is repaired, or when a tow-car has arrived on the scene, the invention can be collapsed by reversing the above procedure and turning off the switch 14, therefore, it is quite convenient and easy to use.

Summing up, with effective improvement on conventional types of hazard alarm signs, such as simplified and convenient erecting and collapsing procedures, convenient portability and storage, capability of sending long-range and conspicuous alarm signals in all weather or in daytime or nighttime, assurance of vehicle and personnel safety, etc., the present invention is a novel creation with its novelty, originality and applicability that will fully satisfy the qualifications for a patent right, hence this application is filed in accordance with the Patent Law to protect the subject inventor's rights and interests. Your favorable consideration shall be appreciated.

I claim:

1. A hazard alarm sign, comprising:

a storage box having a box body with a battery disposed at one side at a bottom portion thereof, the box body having an erecting plate mounted adjacent a top portion thereof with a control circuit board secured thereto, the box body having a switch and a power socket mounted to a wall therein and a magnet on the bottom portion on the other side of the box body, the box body having two fixing units respectively mounted to an upper portion thereof, the box body having an elastic snap disposed adjacent one of the fixing units and a plurality of non-skid pads on a bottom surface of the box body;

a box cover hingedly coupled to the box body and forming a closure therefor;

an alarm rack formed of three racks, respectively a front rack, a middle rack and a rear rack hingedly coupled together, each of the three racks being made of a transparent material and having a lamp holding plate disposed therein, the holding plate carrying a plurality of LED lamps thereon, the front rack being coupled to the two fixing units at a front edge of said storage box, a first end of the middle rack being hinged with a first hollow shaft to an end of the front rack, a first end of the rear rack being hinged with a second hollow shaft to a second end of the middle rack, a second end of the rear rack having a snap hole formed therein for releasable coupling with the elastic snap; and, electric wires running through the first and second hollow shafts and connected to the control circuit board, the switch, the power sockets, battery inside the storage box and the plurality of LED lamps to form an electrical circuit.

\* \* \* \* \*